(12) United States Patent
Fu et al.

(10) Patent No.: US 9,789,498 B2
(45) Date of Patent: Oct. 17, 2017

(54) STRUCTURE OF GYRATING NOZZLE SPRAY GUN

(71) Applicant: Neutek International Inc., New Taipei (TW)

(72) Inventors: Den-Nan Fu, New Taipei (TW); Huang-Yuan Huang, New Taipei (TW)

(73) Assignee: NEUTEK INTERNATIONAL INC., New Taipei (TW)

( * ) Notice: Subject to any disclaimer, the term of this patent is extended or adjusted under 35 U.S.C. 154(b) by 0 days.

(21) Appl. No.: 15/360,109

(22) Filed: Nov. 23, 2016

(65) Prior Publication Data

US 2017/0072414 A1   Mar. 16, 2017

Related U.S. Application Data

(63) Continuation of application No. 14/716,058, filed on May 19, 2015.

(51) Int. Cl.

| | |
|---|---|
| *B05B 3/04* | (2006.01) |
| *B60S 3/04* | (2006.01) |
| *B08B 3/02* | (2006.01) |
| *B05B 3/06* | (2006.01) |
| *B05B 7/06* | (2006.01) |
| *B05B 7/24* | (2006.01) |
| *B05B 1/00* | (2006.01) |

(Continued)

(52) U.S. Cl.
CPC ............ *B05B 3/0409* (2013.01); *B05B 1/005* (2013.01); *B05B 3/0427* (2013.01); *B05B 3/06* (2013.01); *B05B 7/0416* (2013.01); *B05B 7/064* (2013.01); *B05B 7/10* (2013.01); *B05B 7/2435* (2013.01); *B08B 3/026* (2013.01); *B08B 3/028* (2013.01); *B60S 3/044* (2013.01)

(58) Field of Classification Search
CPC ....... B05B 3/022; B05B 3/026; B05B 3/0409; B05B 3/0427; B05B 3/044; B05B 3/06; B05B 3/1035; B05B 7/2435; B08B 3/026
USPC .... 239/264, 265, 525–532, 214, 223, 225.1, 239/237, 263
See application file for complete search history.

(56) References Cited

U.S. PATENT DOCUMENTS 4,792,096 A * 12/1988 Gregory .................. B05B 15/02
  239/113
6,422,480 B1 * 7/2002 Richmond ................ B05B 3/02
  239/10

(Continued)

*Primary Examiner* — Alexander Valvis
(74) *Attorney, Agent, or Firm* — Muncy, Geissler, Olds & Lowe, P.C.

(57) ABSTRACT

An improved structure of gyrating nozzle spray gun includes a grip including an air inlet and a trigger-controlled valve seat, a gas delivery tube connected to the valve seat, and a gyrating nozzle head including a connection nut threaded onto a front tubular mating connection screw rod of the gas delivery tube, an end cap threaded onto outer thread of the connection nut, a bearing positioned in the end cap, and a rotator mounted in the bearing and rotatable with an inner race of the bearing and defining therein a gas accumulation chamber for receiving compressed air from the valve seat via the gas delivery tube and the connection nut and an oblique jet hole eccentrically located in the front wall thereof for ejecting compressed air and causing the rotator to rotate during ejection of compressed air.

7 Claims, 6 Drawing Sheets

(51) Int. Cl.
  *B05B 7/04* (2006.01)
  *B05B 7/10* (2006.01)

(56) References Cited

U.S. PATENT DOCUMENTS

| | | | | |
|---|---|---|---|---|
| 7,530,474 | B2* | 5/2009 | Amron | B05B 3/0427 |
| | | | | 222/79 |
| 7,568,635 | B2* | 8/2009 | Micheli | B05B 3/1014 |
| | | | | 239/240 |
| 8,480,011 | B2* | 7/2013 | Endo | B05B 3/022 |
| | | | | 239/226 |
| 8,807,453 | B2* | 8/2014 | Hsieh | B05B 3/06 |
| | | | | 239/226 |
| 2010/0320289 | A1 | 12/2010 | Kuo | |
| 2012/0286065 | A1* | 11/2012 | Lin | B05B 3/0409 |
| | | | | 239/225.1 |

* cited by examiner

STRUCTURE OF GYRATING NOZZLE SPRAY GUN

This application is a Continuation of co-pending application Ser. No. 14/716,058, filed on May 19, 2015, for which priority is claimed under 35 U.S.C. §120, the entire contents of which are hereby incorporated by reference.

BACKGROUND OF THE INVENTION

1. Field of the Invention

The present invention relates to spray gun technology and more particularly, to an improved structure of gyrating nozzle spray gun, which comprises a grip, a gas delivery tube connected to the grip, and a gyrating nozzle head connected to the gas delivery tube and holding a rotator in a bearing inside an end cap thereof for ejecting compressed air in a spiral pattern.

2. Description of the Related Art

In the implementation of a general cleaning work to clean a motorcycle or car, or the outer wall of a building, people normally will apply a flow of water to the surface of the object to be cleaned and simultaneously wipe the surface of the object with a brush or cloth. When cleaning a car or a building, it is necessary to apply a strong jet of water to the surface to be cleaned and then to wipe the surface with a brush or cloth. Further, in order for ejecting a strong jet of water onto the surface to be cleaned, people normally will attach a water hose to a water tap and squeeze the terminal end of the water hose with the fingers, enabling water to be ejected out of the terminal end of the water hose onto the surface to be cleaned. After washing the surface with jets of water, a brush or cloth is then used to clean the washed surface. This cleaning method is time-consuming and wastes a large amount of water, and therefore, it does not meet the demands of saving water and energy. In order to improve the problem of waste of water resources, some gyrating nozzle spray gun designs are created to combine the use of high-pressure air with a water gun for strengthening the force of water scouring, avoiding causing a huge loss of water. There is known a conventional gyrating nozzle spray gun generally that comprises a handle, a T-bar, a liquid tank, and a spray nozzle assembly. The spray nozzle assembly comprises a horn-shaped barrel having a screw connection located at one end thereof and fastened to an air output end of the T-bar, a gyrating tube having connector located at one end thereof and rotatably coupled to air output end of the T-bar inside the screw connection, a plurality of counterweights mounted around the periphery of the gyrating tube, a dip tube inserted through the gyrating tube and the T-bar and dipped in the liquid tank, and a nozzle tip located at one end of the dip tube. In application, a flow of compressed air from an external compressed air source is guided through an air passage in the handle and the T-bar into the gyrating tube. When compressed air goes through the gyrating tube and the nozzle tip of the dip tube, a Venturi effect is created to suck the storage liquid out of the liquid tank into the T-bar for mixing with the compressed air around the nozzle tip so that the air-liquid mixture can be forced out of horn-shaped barrel in the form of a mist of fine droplets for application. However, in actual application, when the gyrating tube of the gyrating nozzle spray gun is forced by the flow of compressed air to rotate in the horn-shaped barrel at a high speed, the gyrating tube and the counterweights will be forced to rub against the inside wall of the horn-shaped barrel, causing the gyrating tube and the counterweights to wear quickly with use. After a long use, the connection area between the connector of the gyrating tube and the output end of the T-bar can break easily, and the broken component part can be forced out of the horn-shaped barrel, leading to an accident.

Therefore, it is desirable to provide a gyrating nozzle spray gun that eliminates the problem of the aforesaid prior art design.

SUMMARY OF THE INVENTION

The present invention has been accomplished under the circumstances in view. It is therefore the main object of the present invention to provide an improved structure of gyrating nozzle spray gun, which eliminates the problem of wear between the gyrating tube and the inside wall of the horn-shaped barrel and the problem of breaking risk of the gyrating tube during operation.

To achieve this and other objects of the present invention, an improved structure of gyrating nozzle spray gun comprises a grip, a gas delivery tube connected to the grip, and a gyrating nozzle head mounted on the front end of the gas delivery tube. The gas delivery tube comprises a tubular mating connection screw rod located at the front end thereof. The gyrating nozzle head comprises a connection nut, an end cap fastened to the connection nut, a bearing mounted in said end cap and a rotator rotatably mounted in the end cap within the bearing. The connection nut comprises a through hole, a screw hole located in the rear side of the through hole and threaded onto the tubular mating connection screw rod of the gas delivery tube, and an outer thread extending around the periphery of the front side thereof. The end cap comprises an accommodation open chamber, an inner thread located in one side of the accommodation open chamber and threaded onto the outer thread of the connection nut, an outer chamber located in an opposite side of the accommodation open chamber, and an opening surrounded by an inside wall of the outer chamber. The rotator is accommodated in the accommodation open chamber of the end cap, comprising a rotator head, inserted into the opening of the end cap and defining a front wall, a gas accumulation chamber defined in the rotator head, an oblique jet hole eccentrically and obliquely located at the front wall of the rotator head and disposed in communication with the gas accumulation chamber, a rim radially extended around the periphery of one end of the rotator head, and a stop flange located at one side of the rim and extended around and abutted to the periphery of the rotator head and stopped at one side of the bearing. Further, the rim and the rotator head define a restricted space in the outer chamber of the end cap. The bearing is mounted in the restricted space in the end cap around the rotator head of the rotator and stopped with one side edge thereof against the stop flange of the rotator and an opposite side edge thereof against an inner end edge of the opening of the end cap, comprising an outer race tightly fitted into an inner peripheral wall of the outer chamber in the accommodation open chamber of the end cap and an inner race mounted on the rotator head of the rotator and rotatable with the rotator relative to the outer race. When operating the trigger of the grip, compressed air is guided from an external high-pressure air source through an air inlet of the grip into the gas delivery tube and the gyrating nozzle head and then forced out of an oblique jet hole in the front wall of the rotator head of the rotator of the gyrating nozzle head, and thus, a swirling flow of compressed air is ejected out of the spray gun.

In an alternate form of the present invention, the rotator further comprises a through hole located in the front side thereof. Further, the gas delivery tube is a T-shaped three-way tube, comprising a bottom connection tube located at a bottom side thereof and mounted with a water tank, a dip tube connected to the bottom connection tube and inserted into the water tank for sucking a fluid (such as clean water, cleaning solution, soapy water or water wax) from the water tank into the bottom connection tube, a water-supply tube connected to the bottom connection tube in communication with the dip tube and inserted into the gas-delivery hole of the gas delivery tube, the through hole of the connection nut and the gas accumulation chamber of the rotator and terminating in a water outlet tip that is inserted into the through hole in the front wall of the rotator head of the rotator. Further, the diameter of the through hole of the rotator is larger than the outer diameter of the water outlet tip so that an annular gap is defined in the through hole of the rotator around the water outlet tip for the passing of compressed air. Thus, when a swirling flow of compressed air is ejected out of the oblique jet hole of the gyrating nozzle head, a flow of fluid is sucked into the bottom connection tube of the gas-delivery tube and ejected out of the water outlet tip of the water-supply tube, and the fluid being ejected out of the water outlet tip is then turned into a mist subject to the effect of the ejected swirling flow of compressed air.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
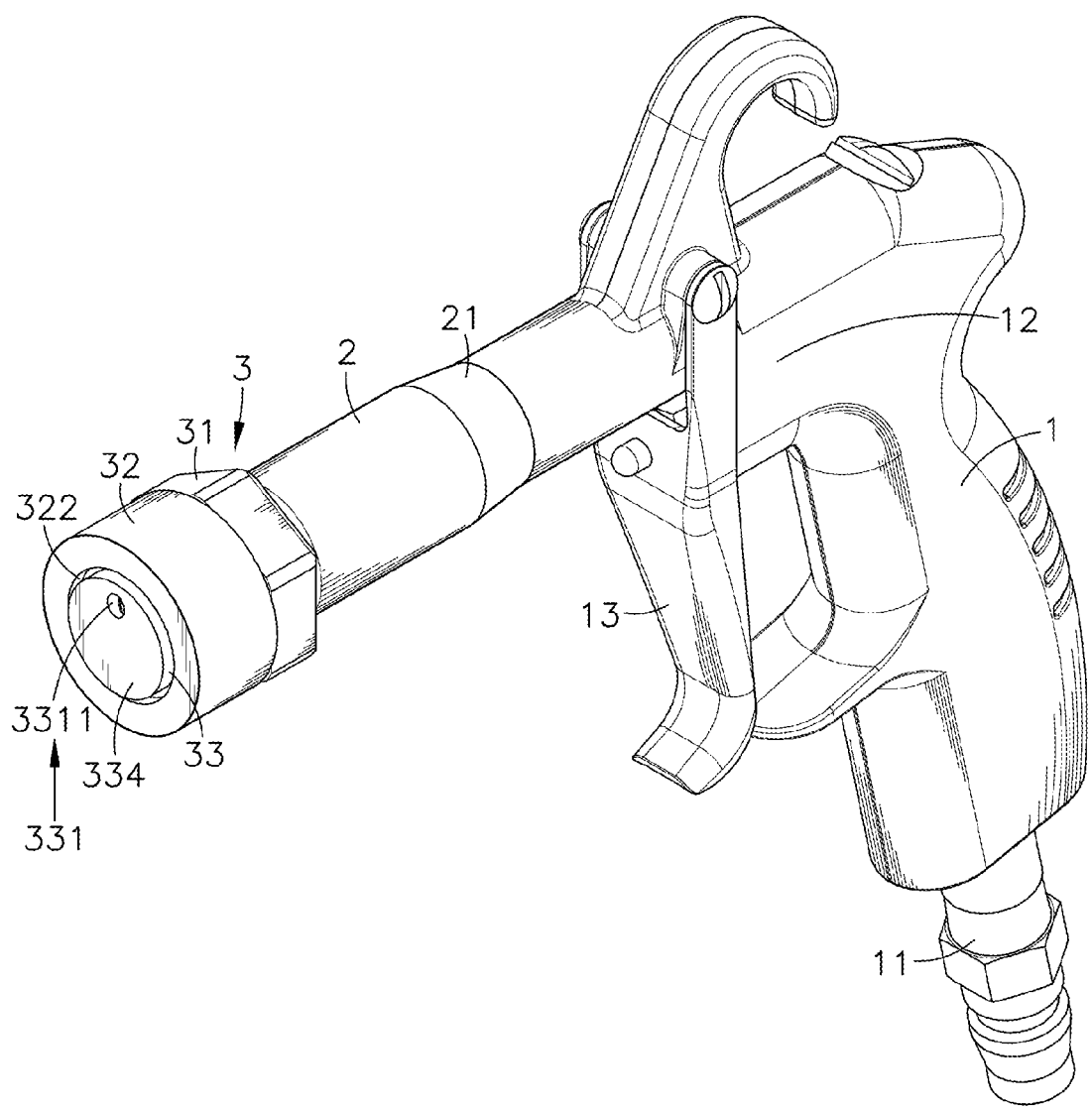
FIG. 1 is an oblique top elevational view of an improved structure of gyrating nozzle spray gun in accordance with the present invention.
Figure 2:
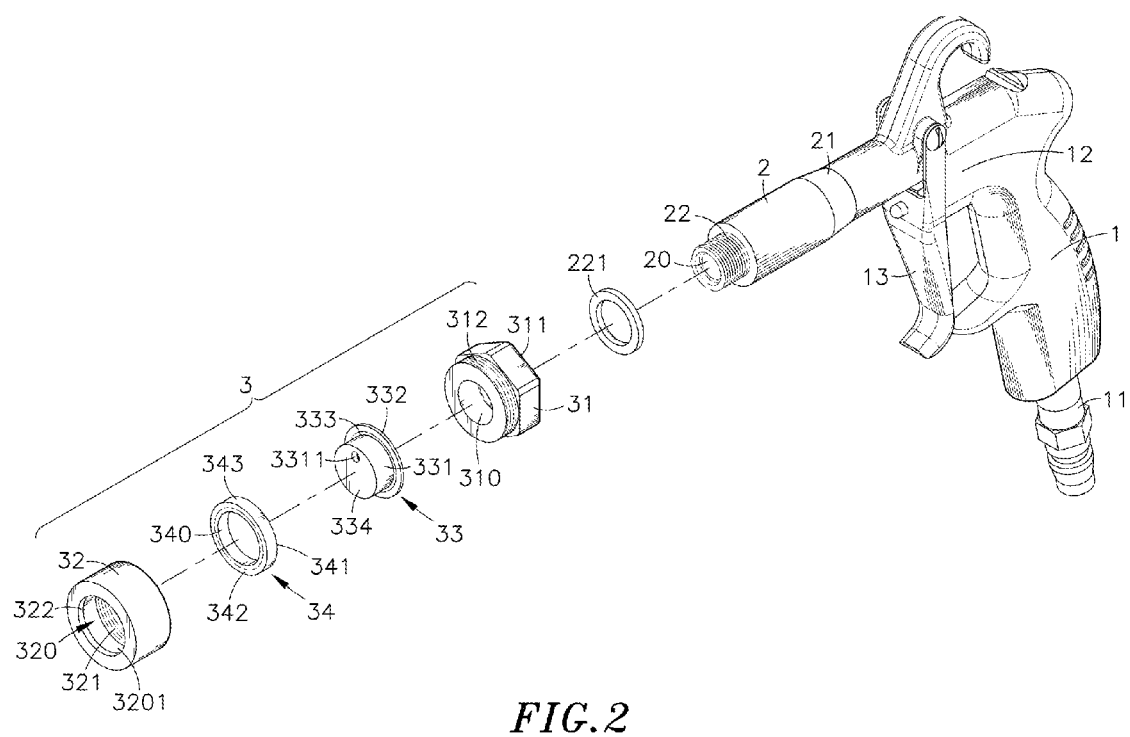
FIG. 2 is an exploded view of the improved structure of gyrating nozzle spray gun in accordance with the present invention.
Figure 3:
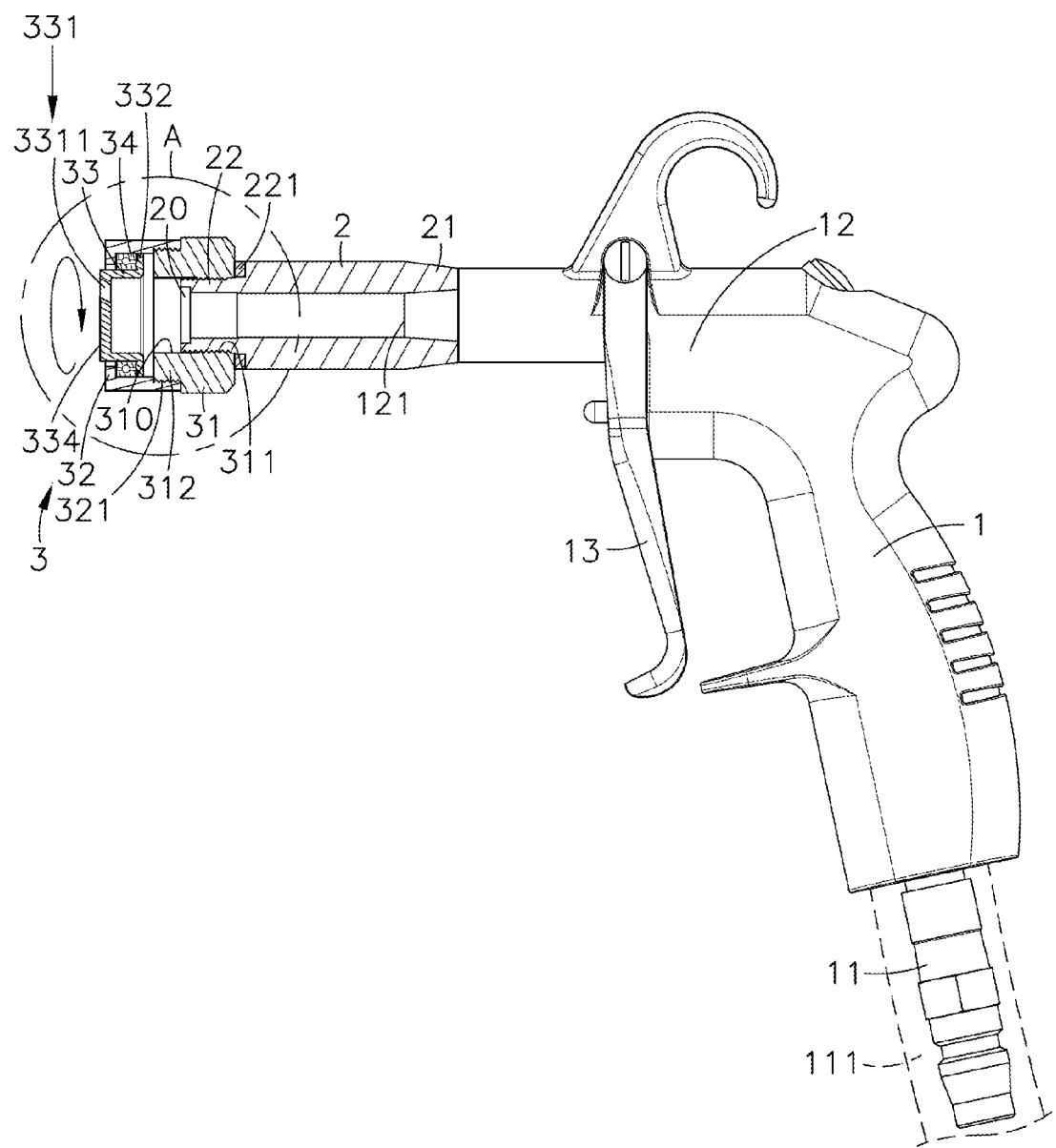
FIG. 3 is a schematic sectional side view of the improved structure of gyrating nozzle spray gun in accordance with the present invention.
Figure 4:
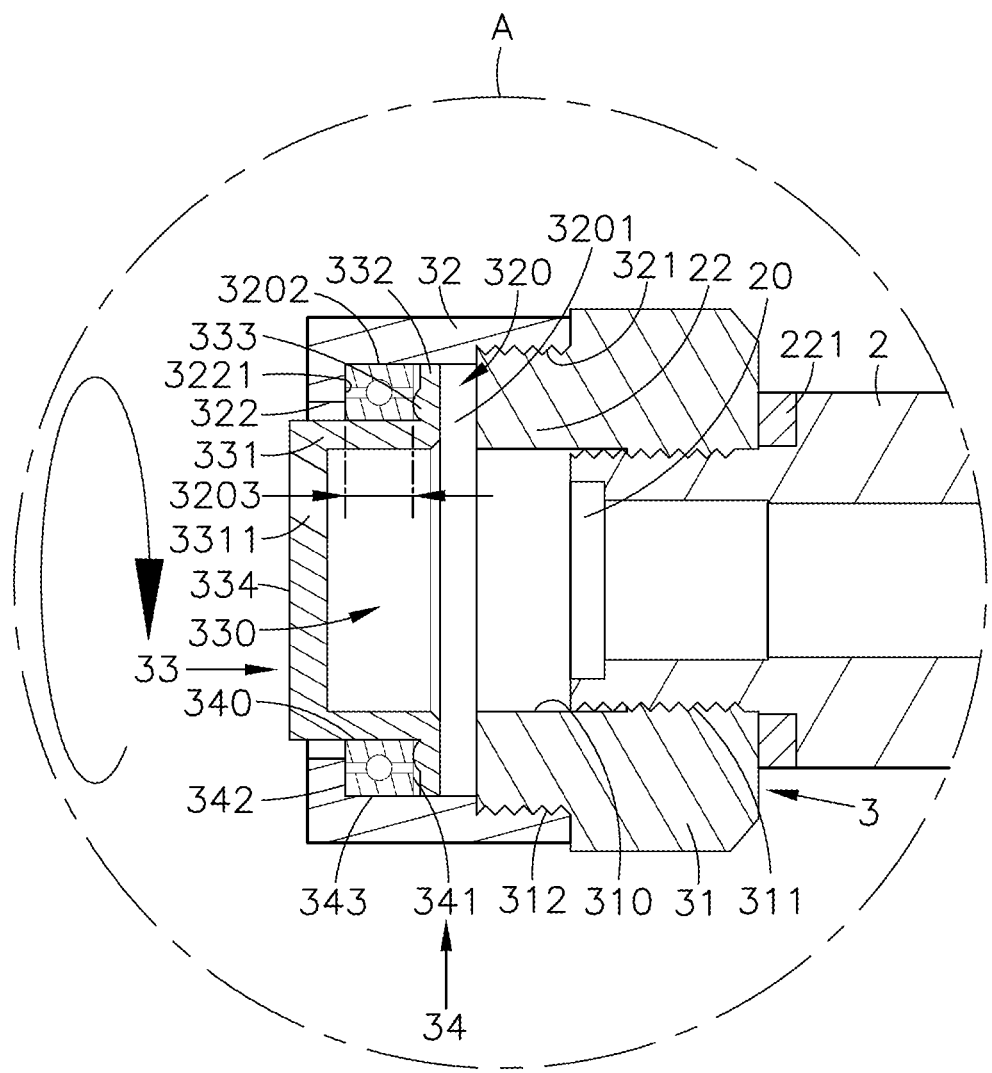
FIG. 4 is an enlarged view of Part A of FIG. 3.

Referring to FIGS. 1-4, an elevational view of an improved structure of gyrating nozzle spray gun, an exploded view of the improved structure of gyrating nozzle spray gun, a sectional side view of the improved structure of gyrating nozzle spray gun and an enlarged view of Part A of FIG. 3 are shown. As illustrated, the gyrating nozzle spray gun comprises a grip 1, a gas delivery tube 2 and a gyrating nozzle head 3.

The grip 1 comprises an air inlet 11 located at a bottom side thereof, a valve seat 12 located at a top side thereof, and a trigger 13 operable to open the valve seat 12 for letting an outer compressed flow of air go through the air inlet 11 into the valve seat 12 toward an air outlet 121 of the valve seat 12.

The gas delivery tube 2 comprises a mating connection end piece 21 located at one end thereof, a mating connection screw rod 22 located at an opposite end thereof, and a gas-delivery hole 20 axially extending through the mating connection end piece 21 and the mating connection screw rod 22.

The gyrating nozzle head 3 comprises a connection nut 31, an end cap 32 fastened to the connection nut 31, and a rotator 33 and a bearing 34 movably mounted in the end cap 32. The connection nut 31 comprises a through hole 310 extending through opposing front and rear sides thereof, a screw hole 311 located in the rear side within the through hole 310, and an outer thread 312 extending around the periphery of the front side. The end cap 32 comprises an accommodation open chamber 320, an inner thread 321 located in one side of the accommodation open chamber 320 and threaded onto the outer thread 312 of the connection nut 31, an outer chamber 3201 located in an opposite side of the accommodation open chamber 320, and an opening 322 surrounded by an inside wall 3202 of the outer chamber 3201. The rotator 33 is accommodated in the accommodation open chamber 320 of the end cap 32, comprising a rotator head 331 defining a front wall 334, a gas accumulation chamber 330 defined in the rotator head 331, an oblique jet hole 3311 eccentrically and obliquely located at a front wall 334 of the rotator head 331 and disposed in communication with the gas accumulation chamber 330, a rim 332 radially extended around the periphery of one end of the rotator head 331 remote from the front wall 334, and a stop flange 333 located at one side of the rim 332 and extended around and abutted to the periphery of the rotator head 331. Further, the rotator head 331 supports the bearing 34 in the accommodation open chamber 320 of the end cap 32 and is inserted into the opening 322 of the end cap 32. The bearing 34 is mounted in the accommodation open chamber 320 of the end cap 32 around the rotator head 331 of the rotator 33, and stopped with one side edge 341 thereof against the stop flange 333 of the rotator 33 and an opposite side edge 342 thereof against an inner end edge 3221 of the opening 322. Further, the bearing 34 consists of an inner race 340, and an outer race 343. The inner race 340 is rotatable relative to the outer race 343. The outer race 343 is tightly fitted into the inside wall 3202 of the outer chamber 3201 in the accommodation open chamber 320 of the end cap 32. Thus, a restricted space 3203 is defined in the outer chamber 3201 by the rim 332 and rotator head 331 of the rotator 33 for the positioning of the bearing 34 to prevent sliding displacement of the bearing 34 relative to the rotator head 331, enabling the inner race 340 of the bearing 34 to assist the rotation of the rotator 33. After installation, the front wall 334 of the rotator head 331 is disposed in the opening 322. Further, the front wall 334 is a flat wall.

In installation of the gyrating nozzle spray gun, connect the air inlet 11 of the grip 1 to an external high-pressure air source (such as air compressor), and then, connect the mating connection end piece 21 of the gas delivery tube 2 to the air outlet 121 of the valve seat 12 of the grip 1, and then attach a gasket ring 221 to the tubular mating connection screw rod 22 of the gas delivery tube 2, and then thread the screw hole 311 of the connection nut 31 of the gyrating nozzle head 3 onto the tubular mating connection screw rod 22 of the gas delivery tube 2 to stop the gasket ring 221 tightly against the gas delivery tube 2 so that the gasket ring 221 can seal the gap in the connection between the connection nut 31 and the tubular mating connection screw rod 22. At this time, the through hole 310 of the connection nut 31 and the gas accumulation chamber 330 of the rotator 33 are kept in line and communication with the gas-delivery hole 20 of the gas delivery tube 2. Thus, the grip 1, the gas delivery tube 2 and the gyrating nozzle head 3 are assembled to constitute the gyrating nozzle spray gun of the present invention. When a flow of high-pressure air is delivered through the air inlet 11 of the grip 1 and the air outlet 121 of the valve seat 12 into the gas-delivery hole 20 of the gas delivery tube 2 and the gas accumulation chamber 330 in the rotator head 331 of the rotator 33, the running flow of high-pressure air drives the rotator head 331 of the rotator 33 to rotate with the inner race 340 of the bearing 34 in the opening 322 of the end cap 32.

In actual application of the gyrating nozzle spray gun, the user can operate the trigger 13 of the grip 1 to open the valve seat 12, enabling a flow of high-pressure air to be delivered from the external high-pressure air source through the air inlet 11 of the grip 1 and the air outlet 121 of the valve seat 12 into the gas-delivery hole 20 of the gas delivery tube 2, the through hole 310 of the connection nut 31 and then the gas accumulation chamber 330 in the rotator head 331 of the rotator 33 and then ejected out of the gas accumulation chamber 330 through the oblique jet hole 3311. When the running flow of high-pressure air is being delivered into the gas accumulation chamber 330 of the rotator 33, it will be accumulated in the gas accumulation chamber 330 of the rotator 33 and forced out of the oblique jet hole 3311 and the opening 322 of the end cap 32, causing rotation of the rotator 33 with the inner race 340 of the bearing 34 in the outer chamber 3201 and opening 322 of the end cap 32. Because the oblique jet hole 3311 is eccentrically and obliquely located at the front wall 334 of the rotator 33 and the bearing 34 is supported on the rotator head 331 and abutted against the stop flange 333 of the rotator 33 and a gap is left between the rim 332 of the rotator 33 and the outer perimeter of the connection nut 31, when the high-pressure of air is accumulated in the gas accumulation chamber 330 of the rotator 33 and forced out of the oblique jet hole 3311, the rotator head 331 of the rotator 33 will be forced by the running flow of high-pressure air to rotate with the inner race 340 of the bearing 34 in the opening 322 of the end cap 32 freely without interference, enabling the high-pressure air to be continuously ejected out of the accumulation chamber 330 of the rotator head 331 through the oblique jet hole 3311 of the front wall 334 and the opening 322 of the end cap 32 in a spiral pattern.

Further, subject to the design of the rim 332 around the periphery of one end of the rotator head 331 of the rotator 33 of the gyrating nozzle head 3, the rotator 33 is shaped like a tall hat with the flat front wall 334 located at the front side so that the restricted space 3203 is defined between the rim 332 of the rotator 33 and the outer chamber 3201 of the end cap 32 for accommodating the bearing 34. Since only one bearing 34 is used and mounted in the said restricted space 3203 without occupying much internal space of the accommodation open chamber 320 of the end cap 32, bearing installation cost can be minimized.

Further, the gyrating nozzle head 3 is directly fastened to the gas delivery tube 2, the high pressure air delivery path is shortened and the structural strength of the air ejection structure of the gyrating nozzle spray gun is enhanced, avoiding separation between the gyrating nozzle head 3 and the gas delivery tube 2 during operation and ensuring application safety and reliability.

Figure 5:
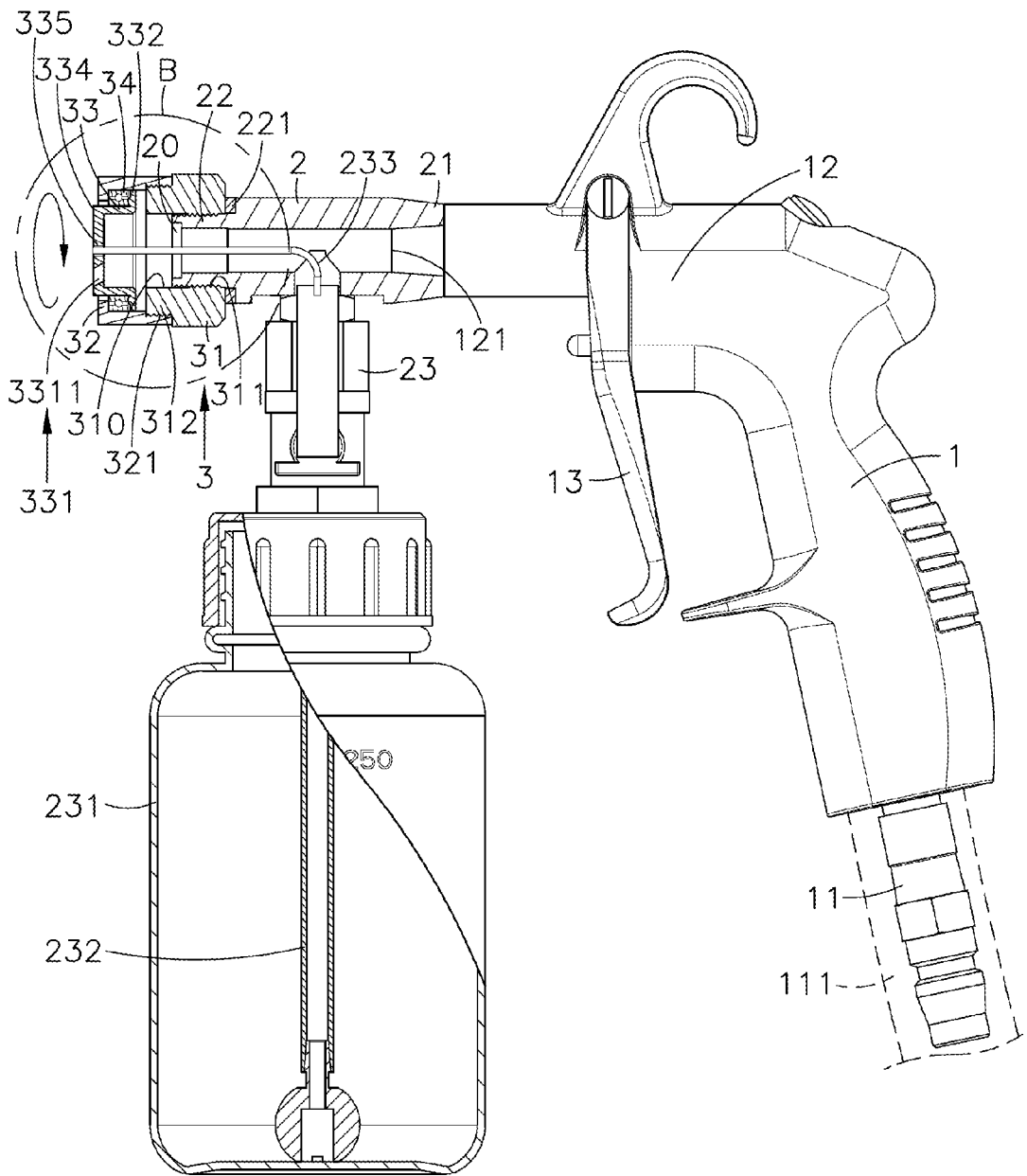
FIG. 5 is a schematic sectional side view of an alternate form of the improved structure of gyrating nozzle spray gun in accordance with the present invention.
Figure 6:
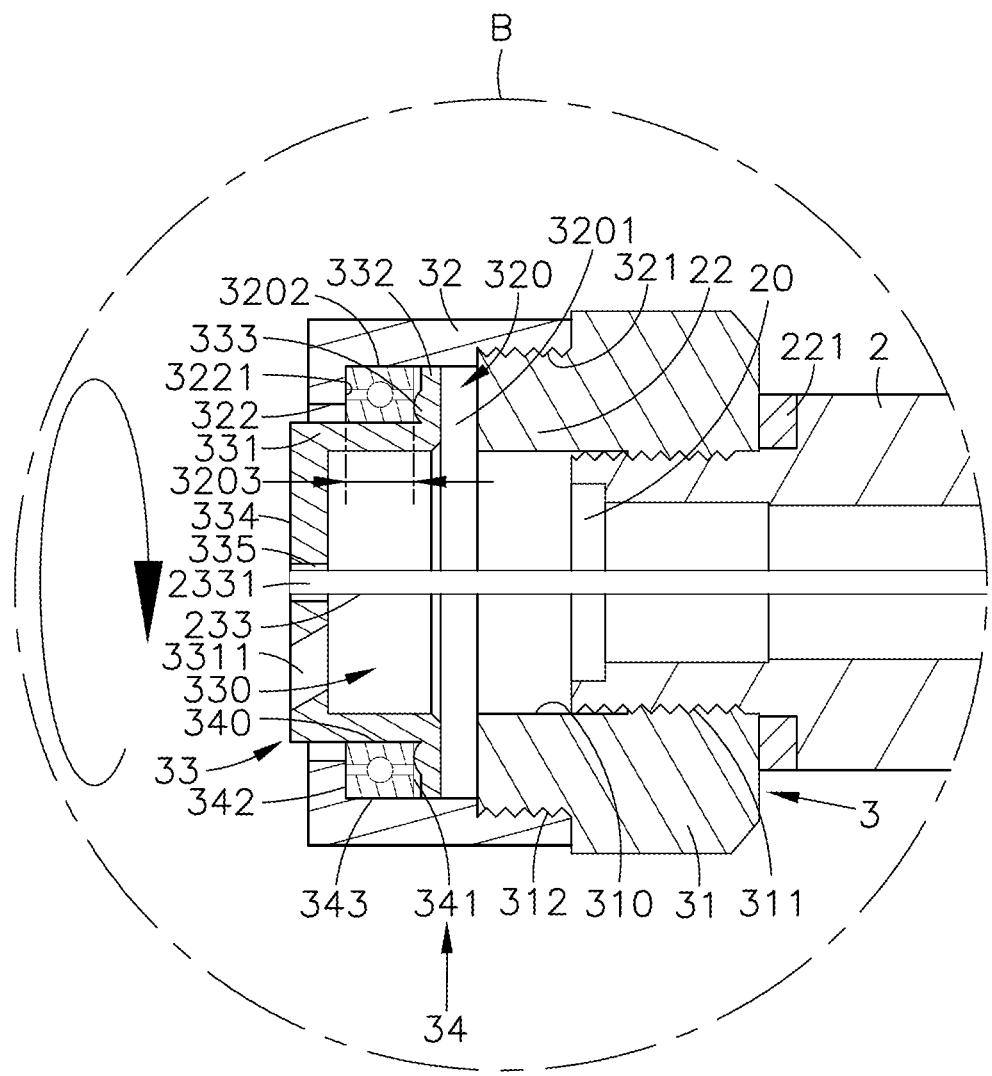
FIG. 6 is an enlarged view of Part B of FIG. 5.

Referring to FIGS. 5 and 6 and FIG. 2 again, an alternate form of the gyrating nozzle spray gun is shown. This alternate form is practical for ejecting a swirling flow of water mist. According to this alternate form, the gas delivery tube 2 is a T-shaped three-way tube having a bottom connection tube 23 vertically disposed at a bottom side thereof for the connection of a water tank 231. Further, a dip tube 232 is connected to the bottom connection tube 23 and suspending in the water tank 231 near the bottom wall of the water tank 231. Further, a water-supply tube 233 is mounted in the gas-delivery hole 20 of the gas delivery tube 2 and extended from the bottom connection tube 231 through the gas-supply hole 20 of the gas delivery tube 2 and the through hole 310 of the connection nut 31 of the gyrating nozzle head 3 into the gas accumulation chamber 330 in the rotator head 331 of the rotator 33, and terminating in a water outlet tip 2331 that is inserted into a through hole 335 at the center of the front wall 334 of the rotator 33 and defined in one end of the gas accumulation chamber 330 in the rotator head 331 of the rotator 33. Further, the through hole 335 has a diameter larger than the outer diameter of the water outlet tip 2331 so that an annular gap is left in the through hole 335 around the water outlet tip 2331 of the water-supply tube 233.

In application, connect the air inlet 11 of the grip 1 to an external high-pressure air source (air compressor) with a high pressure hose 111, and then operate the trigger 13 of the grip 1 to control the intake of compressed air from the external high-pressure air source through the air inlet 11 and an air-delivery hole 121 of the valve seat 12 into the gas-delivery hole 20 of the gas delivery tube 2, enabling the intake flow of compressed air to go through the through hole 310 of the connection nut 31 of the gyrating nozzle head 3 into the gas accumulation chamber 330 in the rotator head 331 of the rotator 33 of the gyrating nozzle head 3, and then to go from the gas accumulation chamber 330 through the oblique jet hole 3311 toward the outside of the spray gun and to simultaneously force the rotator head 331 of the rotator 33 to rotate with the inner race 340 of the bearing 34 in the opening 322 of the end cap 32, and thus, a strong jet of air is continuously rotated and ejected out of the spray gun. When the intake flow of compressed air goes through the annular gap in the through hole 335 around the water outlet tip 2331, a Venturi effect is created in the through hole 335 of the rotator 33, causing the contained fluid to be sucked from the water tank 231 through the dip tube 232 and the bottom connection tube 23 into the water-supply tube 233 and then guided out of the water-supply tube 233 through the water outlet tip 2331 that is inserted into the through hole 335 of the rotator 33. When a flow of fluid is being ejected out of the water outlet tip 2331, compressed air is continuously guided into the gas accumulation chamber 330 in the rotator head 331 of the rotator 33 and ejected out of the oblique jet hole 3311 toward the opening 322 of the end cap 32 and the annular gap in the through hole 335 around the water outlet tip 2331, causing the flow of fluid being ejected out of the water outlet tip 2331 to be turned into a mist.

Thus, when the user operates the trigger 13 of the grip 1 to let a flow of compressed air go from the external high-pressure air source through the air inlet 11 into the gas delivery tube 2 to the outside of the spray gun through the oblique jet hole 3311 of the rotator 33 of the gyrating nozzle head 3 and the annular gap in the through hole 335 around the water outlet tip 2331, a flow of fluid is ejected out of the water outlet tip 2331 and turned into a mist. When compressed air is ejected out of the annular gap in the through hole 335 around the water outlet tip 2331 to turn the ejected flow of fluid into a mist, compressed air is simultaneously ejected out of the oblique jet hole 3311, making the mist finer.

As described above, the gas delivery tube 2 is connected to the grip 1; the screw hole 311 of the connection nut 31 of the gyrating nozzle head 3 is threaded onto the tubular mating connection screw rod 22 of the gas delivery tube 2;

the end cap 32 of the gyrating nozzle head 3 is threaded onto the connection nut 31 to hold the bearing 34 and the rotator 33 therein, allowing rotation of the rotator 33 with the inner race 340 of the bearing 34 in the opening 322 of the end cap 32.

In application, the air inlet 11 of the grip 1 is connected to an external high-pressure air source. When the trigger 13 is operated to open the valve seat 12, compressed air is guided through the air inlet 11 of the grip 1 and the gas-delivery hole 20 of the gas delivery tube 2 and the rotator 33 of the gyrating nozzle head 3, and then forced out of the oblique jet hole 3311 of the rotator head 331 of the rotator 33 and the opening 322 of the end cap 32, and the centrifugal force thus produced causes the rotator 33 to rotate with the inner race 340 of the bearing 34 in the opening 322 of the end cap 32. Further, the water tank 231 is connected to the bottom connection tube 23 of the gas delivery tube 2, and the dip tube 232 is connected to the bottom connection tube 23 and dipped in the water tank 231. Thus, when a swirling flow of compressed air is ejected out of the oblique jet hole 3311 of the rotator head 331 toward the opening 322 and the annular gap in the through hole 335 around the water outlet tip 2331, a flow of fluid is sucked into the dip tube 232 and guided through the water-supply tube 233 and the water outlet tip 2331 toward the outside of the rotator 33, and the fluid being ejected out of the water outlet tip 2331 is then turned into a mist, compressed air is simultaneously ejected out of the oblique jet hole 3311, making the mist finer.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An improved structure of gyrating nozzle spray gun, comprising a grip, a gas delivery tube connected to said grip, and a gyrating nozzle head mounted on a front end of said gas delivery tube not touching said grip, said grip comprising an air inlet connectable to an external high-pressure air source for the intake of a compressed air, a valve seat and a trigger operable to open said valve seat for letting said compressed air flow into said gas delivery tube and said gyrating nozzle head, wherein:

said gas delivery tube comprises a tubular mating connection screw rod located at the front end thereof;

said gyrating nozzle head comprises a connection nut, an end cap fastened to said connection nut, a bearing mounted in said end cap and a rotator rotatably mounted in said end cap within said bearing, said connection nut comprising a through hole cut through opposing front and rear sides thereof, a screw hole axially located in the rear side thereof in communication with the said through hole of said connection nut and threaded onto said tubular mating connection screw rod of said gas delivery tube and an outer thread of said connection nut extending around a periphery of the front side, said end cap comprising an accommodation open chamber, an inner thread located in one side of said accommodation open chamber and threaded onto said outer thread of said connection nut, an outer chamber located in an opposite side of said accommodation open chamber and an opening surrounded by an inside wall of said outer chamber, said rotator being accommodated in said accommodation open chamber of said end cap and comprising a rotator head, said rotator head defining a front wall and being inserted into the said opening of said end cap, a gas accumulation chamber defined in said rotator head, an oblique jet hole eccentrically and obliquely relative to said through hole located at the said front wall of said rotator head and disposed in communication with said gas accumulation chamber, a rim radially extended around a periphery of one end of said rotator head not touching said front wall and a stop flange located at one side of said rim and extended around and abutted to a periphery of said rotator head and stopped at one side of said bearing, said rim defining with said rotator head a restricted space in said outer chamber of said end cap, said bearing being mounted in said restricted space in said end cap around said rotator head of said rotator and stopped with one side edge thereof against said stop flange of said rotator and an opposite side edge thereof against an inner end edge of said opening of said end cap, said bearing comprising an outer race abuttedly fitted into an inner peripheral wall of said outer chamber in said accommodation open chamber of said end cap and an inner race mounted on said rotator head of said rotator and rotatable with said rotator relative to said outer race; the compressed air flow is ejected out of said oblique jet hole toward said opening of said end cap.

2. The improved structure of gyrating nozzle spray gun as claimed in claim 1, further comprising a gasket ring mounted on said tubular mating connection screw rod of said gas delivery tube and sealed between said gas delivery tube and said connection nut of said gyrating nozzle head.

3. The improved structure of gyrating nozzle spray gun as claimed in claim 1, wherein said end cap further comprises said outer chamber located in a front side of said accommodation open chamber; said bearing is abuttedly fitted into said outer chamber of said end cap of said gyrating nozzle head, comprising said rotatable inner race attached to said rotator head of said rotator for rotation with said rotator relative to said end cap and said gas delivery tube; said rotator inserted into said opening of said end cap comprises said rim formed around the gas accumulation chamber, and said stop flange located on a front surface of said rim; said bearing is stopped at said rim of said rotator thereof abutted against said stop flange of said rotator; said oblique jet hole is obliquely located at an eccentric location relative to said through hole in the said front wall of said rotator head of said rotator and disposed in communication with said gas accumulation chamber.

4. The improved structure of gyrating nozzle spray gun as claimed in claim 1, wherein said rotator is a cylinder with a broad brim; the said front wall of said rotator head of said rotator is a flat wall.

5. The improved structure of gyrating nozzle spray gun as claimed in claim 1, wherein said rotator further comprises a through hole located in the front wall thereof; said gas delivery tube is a T-shaped three-way tube, comprising a bottom connection tube located at a bottom side thereof and detachably connected with a water tank, a dip tube connected to said bottom connection tube and inserted into said water tank for sucking a fluid from said water tank into said bottom connection tube, a water-supply tube connected to said bottom connection tube in communication with said dip tube and inserted into said gas-delivery hole of said gas delivery tube, the through hole of said connection nut and said gas accumulation chamber in said rotator head of said rotator and terminating in a water outlet tip, said water outlet tip of said water-supply tube being inserted into the said through hole in the said front wall of said rotator near said oblique jet hole.

6. The improved structure of gyrating nozzle spray gun as claimed in claim 5, wherein the said through hole of said rotator is located at a center of the said front wall of said rotator head of said rotator and disposed in communication with said gas accumulation chamber; said oblique jet hole is obliquely located at an eccentric location relative to said through hole in the said front wall of said rotator head of said rotator.

7. The improved structure of gyrating nozzle spray gun as claimed in claim 5, wherein the said through hole of said rotator is located at a center of the said front wall of said rotator head of said rotator and disposed in communication with said gas accumulation chamber; a diameter of said through hole of said rotator is larger than an outer diameter of said water outlet tip so that an annular gap is defined in the through hole of said rotator around said water outlet tip for the passing of said compressed air flow.

* * * * *